(12) United States Patent
Fujii

(10) Patent No.: US 8,102,934 B2
(45) Date of Patent: Jan. 24, 2012

(54) TRANSMITTING APPARATUS AND METHOD

(75) Inventor: Masaaki Fujii, Yokohama-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 12/109,601

(22) Filed: Apr. 25, 2008

(65) Prior Publication Data

US 2009/0046009 A1   Feb. 19, 2009

(30) Foreign Application Priority Data

Aug. 16, 2007 (JP) .................................. 2007-212362
Dec. 17, 2007 (KR) ......................... 10-2007-0132645

(51) Int. Cl.
*H04B 7/02* (2006.01)
(52) U.S. Cl. ...................................................... 375/267
(58) Field of Classification Search .................. 375/260, 375/267
See application file for complete search history.

(56) References Cited

U.S. PATENT DOCUMENTS

| 2007/0104283 A1* | 5/2007 | Han et al. ....................... 375/260 |
| 2007/0183371 A1* | 8/2007 | McCoy ........................... 370/334 |
| 2009/0190688 A1* | 7/2009 | Kotecha et al. ............... 375/267 |
| 2010/0303170 A1* | 12/2010 | Zhu et al. ....................... 375/297 |

* cited by examiner

*Primary Examiner* — Don N Vo
(74) *Attorney, Agent, or Firm* — NSIP Law

(57) ABSTRACT

A transmitting apparatus includes a subset matrix setting unit to set a subset matrix corresponding to a channel matrix with respect to each of a plurality of antennas of at least one of a plurality of user terminals, using channel matrices fed back from the plurality of user terminals; a beamforming matrix calculator to perform a predetermined operation using the set subset matrix so as to calculate a beamforming matrix composed of weight vectors respectively corresponding to the plurality of antennas of each of the plurality of user terminals; a beamforming processor to perform a beamforming process on data to be transmitted according to the calculated beamforming matrix so as to generate a transmission signal; and antennas to transmit the transmission signal to the plurality of user terminals. The transmitting apparatus obtains a diversity effect while removing interference between user terminals with a small quantity of computations.

9 Claims, 4 Drawing Sheets

TRANSMITTING APPARATUS AND METHOD

CROSS-REFERENCE TO RELATED APPLICATIONS

This application claims the benefit of Japanese Patent Application No. 2007-212362, filed on Aug. 16, 2007, and Korean Patent Application No. 2007-132645, filed in the Korean Intellectual Property Office on Dec. 17, 2007, the disclosures of which are incorporated herein by reference.

BACKGROUND OF THE INVENTION

1. Field of the Invention

Aspects of the present invention relates to a transmitting apparatus and method and, more particularly, to a transmitting apparatus and method in a multi-user multiple-input and multiple-output (MIMO) system in a mobile communication system.

2. Description of the Related Art

A MIMO transmission method is one technique of increasing a communication speed between wireless devices. The MIMO transmission method is based on input/output of signals using multiple antennas and simultaneously transmits a plurality of transmission data signals using the multiple antennas at the same time. Accordingly, the number of channels through which data signals can be simultaneously transmitted increases, and thus the quantity of information that can be transmitted per unit time can be increased by the increased number of channels. Furthermore, the MIMO transmission method improves communication speed without increasing an occupied frequency band.

However, a plurality of modulated signals having a carrier component of the same frequency is simultaneously transmitted, and thus a receiver needs a way to split mixed modulated signals. Accordingly, the receiver estimates a channel matrix representing transmission characteristics of a wireless transmission path and separates a transmission signal corresponding to each sub-stream from a received signal on the basis of the channel matrix. The channel matrix is estimated using a pilot symbol or the like.

In order to sufficiently remove the influence of noise added to transmission data in a transmission path or interference generated between sub-frames to reproduce a correct transmission signal for each sub-stream, a special idea is required. Recently, various techniques for MIMO signal detection have been developed. In particular, a multi-user MIMO system including a plurality of communication devices capable of performing MIMO signal transmission is being developed. The multi-user MIMO system employs a method of detecting a signal using a minimum mean squared error (MMSE), for example. This method improves transmission characteristics in such a manner that a receiver calculates a signal power-to-interference plus noise power ratio (SINR) after MMSE detection and feeds the SINR to a transmitter and a transmission control parameter is set based on the SINR after MMS detection. Moreover, a receiver of the multi-user MIMO system may use a method of improving transmission characteristic over the MMSE detection method, for example, a maximum likelihood (ML) detection method.

SUMMARY OF THE INVENTION

Aspects of the present invention provide a transmitting apparatus and method for obtaining a diversity gain while removing interference between user terminals with a small computational load.

According to an aspect of the present invention, a transmitting apparatus is provided. The apparatus comprises a subset matrix setting unit to set a subset matrix corresponding to a channel matrix with respect to each of a plurality of antennas of at least one of a plurality of user terminals, using channel matrices fed back from the plurality of user terminals; a beamforming matrix calculator to perform a predetermined operation using the set subset matrix so as to calculate a beamforming matrix composed of weight vectors respectively corresponding to the plurality of antennas of each of the plurality of user terminals; a beamforming processor to perform a beamforming process on data to be transmitted according to the calculated beamforming matrix so as to generate a transmission signal; and antennas to transmit the transmission signal to the plurality of user terminals.

According to another aspect of the present invention, a transmitting method is provided. The method comprises setting a subset matrix corresponding to a channel matrix with respect to each of a plurality of antennas of at least one of a plurality of user terminals, using channel matrices fed back from the plurality of user terminals; performing a predetermined operation using the set subset matrix so as to calculate a beamforming matrix composed of weight vectors respectively corresponding to the plurality of antennas of each of the plurality of user terminals; performing a beamforming process on data to be transmitted according to the calculated beamforming matrix so as to generate a transmission signal; and transmitting the transmission signal to the plurality of user terminals.

According to another aspect of the present invention, there is provided a computer readable recording medium storing a program for executing the transmitting method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
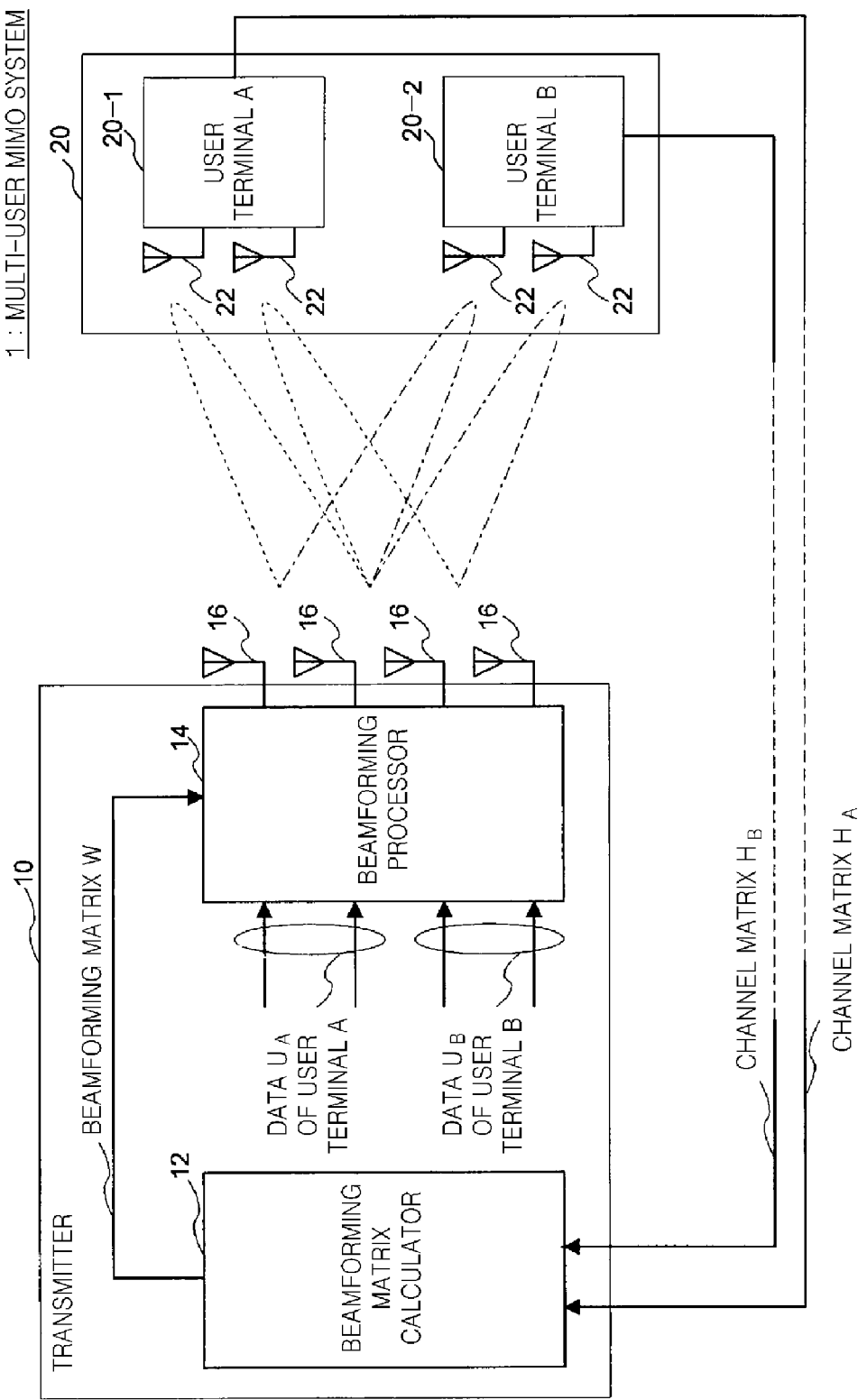
FIG. 1 is a block diagram of a conventional multi-user MIMO system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
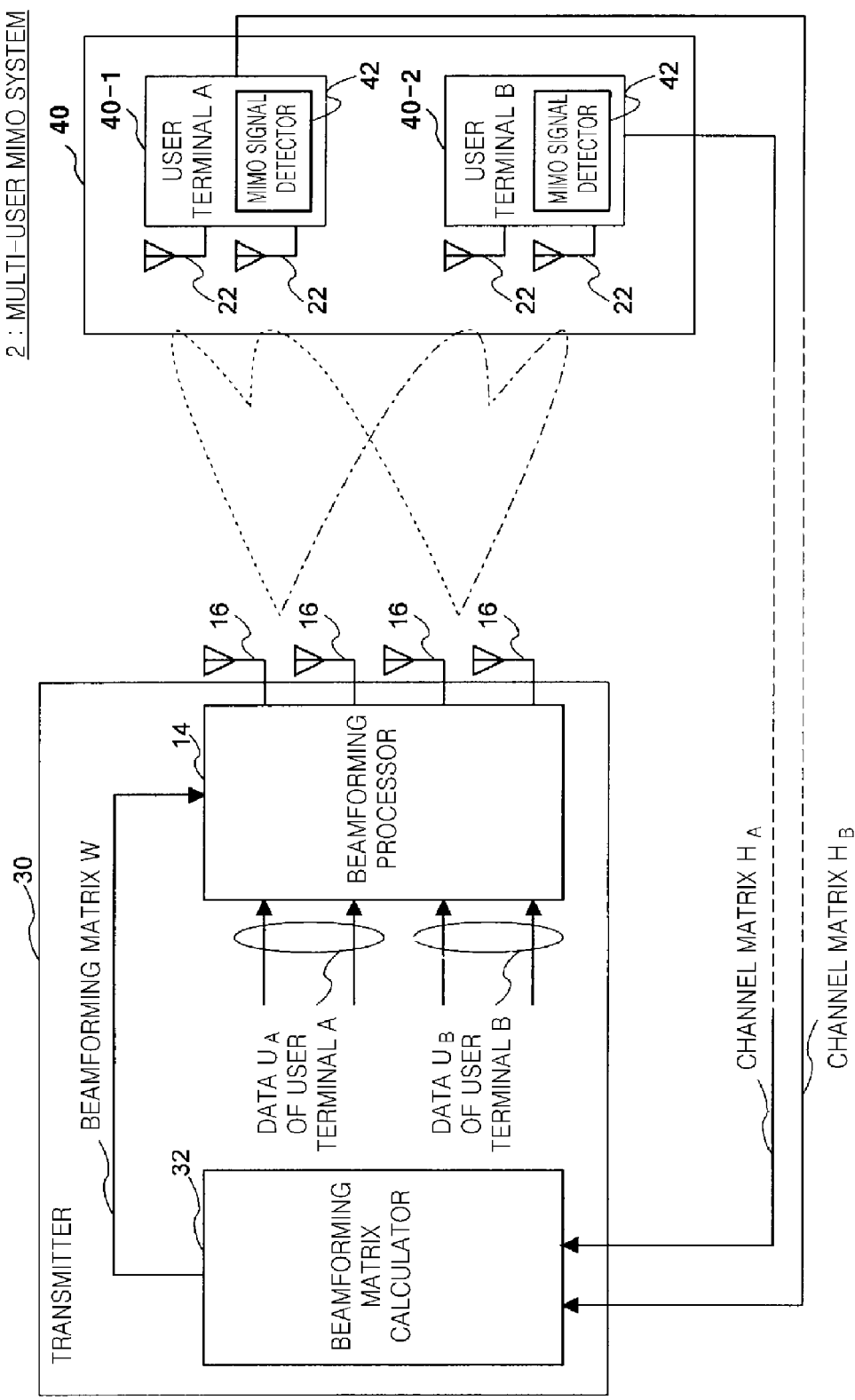
FIG. 2 is a block diagram of another conventional multi-user MIMO system.

FIG. 1 shows a conventional multi-user MIMO system 1 performing communication using a beamforming matrix obtained through an inverse matrix calculation. FIG. 2 shows a conventional multi-user MIMO system 2 performing communication using a beamforming matrix calculated according to singular value decomposition.

Referring to FIG. 1, the multi-user MIMO system 1 includes a transmitter 10 and a plurality of user terminals 20-1 and 20-2. The transmitter 10 includes a beamforming matrix calculator 12, a beamforming processor 14, and a plurality of antennas 16. The user terminals 20-1 and 20-2 respectively include a plurality of antennas 22. The transmitter 10 includes four antennas 16, the multi-user MIMO system 1 includes two user terminals 20-1 and 20-2, and the user terminals 20-1 and 20-2 respectively have two antennas 22.

A channel matrix estimated by the user terminal 20-1 is denoted as $H_A$. A channel matrix estimated by the user terminal 20-2 is denoted as $H_B$, and a channel matrix of a multi-user MIMO channel is denoted as H, as represented by Equation 1. A channel matrix estimated by each user terminal is referred to as a sub channel matrix.

[Equation 1]

$$H_A = \begin{bmatrix} h_{11} & h_{12} & h_{13} & h_{14} \\ h_{21} & h_{22} & h_{23} & h_{24} \end{bmatrix} \quad (1)$$

$$H_B = \begin{bmatrix} h_{31} & h_{32} & h_{33} & h_{34} \\ h_{41} & h_{42} & h_{43} & h_{44} \end{bmatrix} \quad (2)$$

$$H = [H_A^T, H_B^T]^T \quad (3)$$

$$= \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

The beamforming calculator 12 calculates an inverse matrix of a sub channel matrix fed back from each of the user terminals 20-1 and 20-2 to obtain a beamforming matrix W, as represented by Equation 2. The beamforming matrix W allows each user terminal to receive a target signal by adding a weight to a signal according to a channel condition when the signal is transmitted through a plurality of antennas. According to the calculation of the beamforming matrix, the antennas of the user terminals 20-1 and 20-2 are regarded as receivers and an interference component between the antennas is removed. In Equations 1 and 2, H denotes a hermitian operation.

[Equation 2]

$$W = H^H (HH^H)^{-1} \quad (4)$$

Here, a transmission symbol vector transmitted to the user terminal 20-1 is represented as $s_A = [s_1, s_2]^T$, a transmission symbol vector transmitted to the user terminal 20-2 is represented as $s_B = [s_3, s_4]^T$, and a transmission symbol vector transmitted by the transmitter 20 is represented as $s = [s_A^T, s_B^T]$. In addition, a receiving symbol vector received by the user terminal 20-1 is represented as $r_A = [r_1, r_2]^T$, a receiving symbol vector received by the user terminal 20-2 is represented as $r_B = [r_3, r_4]^T$, and a receiving symbol vector received by the multi-user MIMO system 1 is represented as $r = [r_A^T, r_B^T]$. T denotes a transpose.

The beamforming processor 14 applies the beamforming matrix calculated by the beamforming matrix calculator 12 to the transmission symbol vectors and transmits the transmission symbol vectors to the user terminals 20-1 and 20-2. The receiving symbol vector $r = [r_A^T, r_B^T]$ in the multi-user MIMO system 1 is represented by Equation 3 when using Equation 2.

Referring to Equation 3, an effective channel matrix HW after beamforming corresponds to a diagonal matrix from which non-diagonal elements representing interference between beams are all removed.

[Equation 3]

$$r = HWs \quad (5)$$

$$= \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} s_1 \\ s_2 \\ s_3 \\ s_4 \end{bmatrix}$$

As described above, in the multi-user MIMO system 1, an interference component between antennas of each user terminal is removed, and thus a diversity gain is lost. However, since the beamforming matrix is calculated according to a comparatively simple inverse matrix calculation, as represented by Equation 2, the multi-user MIMO system 1 has an advantage of a small quantity of computations.

A multi-user MIMO system 2 using a beamforming matrix calculated according to singular value decomposition will now be explained with reference to FIG. 2. The same components of the multi-user MIMO system 2 as those of the multi-user MIMO system 1 shown in FIG. 1 are represented by the same numerals and explanations of the same components are omitted.

Referring to FIG. 2, the multi-user MIMO system 2 includes a transmitter 30 and a plurality of user terminals 40-1 and 40-2. The transmitter 30 includes a beamforming matrix calculator 32, a beamforming processor 14, and a plurality of antennas 16. The user terminals 40-1 and 40-2 respectively include a plurality of antennas 22 and a MIMO signal detector 42.

The beamforming matrix calculator 32 performs singular value decomposition on sub-channel matrices fed back from the user terminals 40-1 and 40-2 to calculate a beamforming matrix W. For example, the beamforming matrix calculator 32 performs singular value decomposition on a sub channel matrix $H_B$ fed back from the user terminal 40-2 to calculate a singular value vector $V_B$, as represented by Equation 4. A right singular value vector $V_B^{((0))}$ corresponding to a singular value 0 is a null space vector with respect to the sub channel matrix $H_B$. The beamforming matrix calculator 32 uses the right singular value vector $V_B^{((0))}$ as a beamforming matrix element for the user terminal 40-1.

Similarly, the beamforming matrix calculator 32 performs singular value decomposition on a sub channel matrix $H_A$ fed back from the user terminal 40-1 to calculate a singular value vector $V_A$, as represented by Equation 4. Here, a right singular value vector $V_A^{((0))}$ corresponding to the singular value 0 is a null space vector with respect to the sub channel matrix $H_A$. The beamforming matrix calculator 32 uses the right singular value vector $V_A^{((0))}$ as a beamforming matrix element for the user terminal 40-2. As described above, the beamforming matrix calculator 32 calculates the beamforming matrix $W = [(V_B^{((0))}), (V_A^{((0))})]$.

[Equation 4]

$$H_B = U_B [D_B \ 0][V_B^{(1)} \ V_B^{(0)}]^H \quad (6)$$

$$H_A = U_A [D_A \ 0][V_A^{(1)} \ V_A^{(0)}]^H \quad (7)$$

The beamforming processor 14 applies the beamforming matrix W calculated by the beamforming matrix calculator 32 to the transmission symbol vector s. As described above, the beamforming matrix W has a null space vector with respect to the sub channel matrix of one of the user terminals 40-1 and 40-2 as an element. Accordingly, an interference component between the user terminals 40-1 and 40-2 is removed when the beamforming matrix W is used. When the beamforming matrix W is applied to the transmission symbol vector s, the receiving symbol vector r is represented by Equation 5.

[Equation 5]

$$r = HWs = \begin{bmatrix} g_{11} & g_{12} & 0 & 0 \\ g_{21} & g_{22} & 0 & 0 \\ 0 & 0 & g_{33} & g_{34} \\ 0 & 0 & g_{43} & g_{44} \end{bmatrix} \begin{bmatrix} s_1 \\ s_2 \\ s_3 \\ s_4 \end{bmatrix} \quad (8)$$

As represented by Equation 5, interference between the user terminals 40-1 and 40-2 is removed, and thus the MIMO signal detectors 42 included in the user terminals 40-1 and 40-2 can estimate the sub channels of the user terminals 40-1 and 40-2 and detect signals using an MMSE detection method or an MLD detection method.

The above-described method can remove an interference component between user terminals while leaving an interference component between antennas of each user terminal. A MIMO sub-channel is formed for each user terminal while interference between user terminals becomes zero. However, a computational load required for singular value decomposition according to Equation 4 is very large, and thus it is difficult to implement the aforementioned method unless a transmitter having very high computation processing capability is used. However, this transmitter is very expensive and it is difficult to apply the transmitter to a small apparatus.

Aspects of the present invention solve the problems of deterioration of a channel gain and an increase in the computational load. A multi-user system according to aspects of the present invention will now be explained removes interference between user terminals, and calculates a beamforming matrix obtained from a MIMO sub-channel according to each user terminal based on an inverse matrix calculation with a relatively small quantity of computations.

Figure 3:
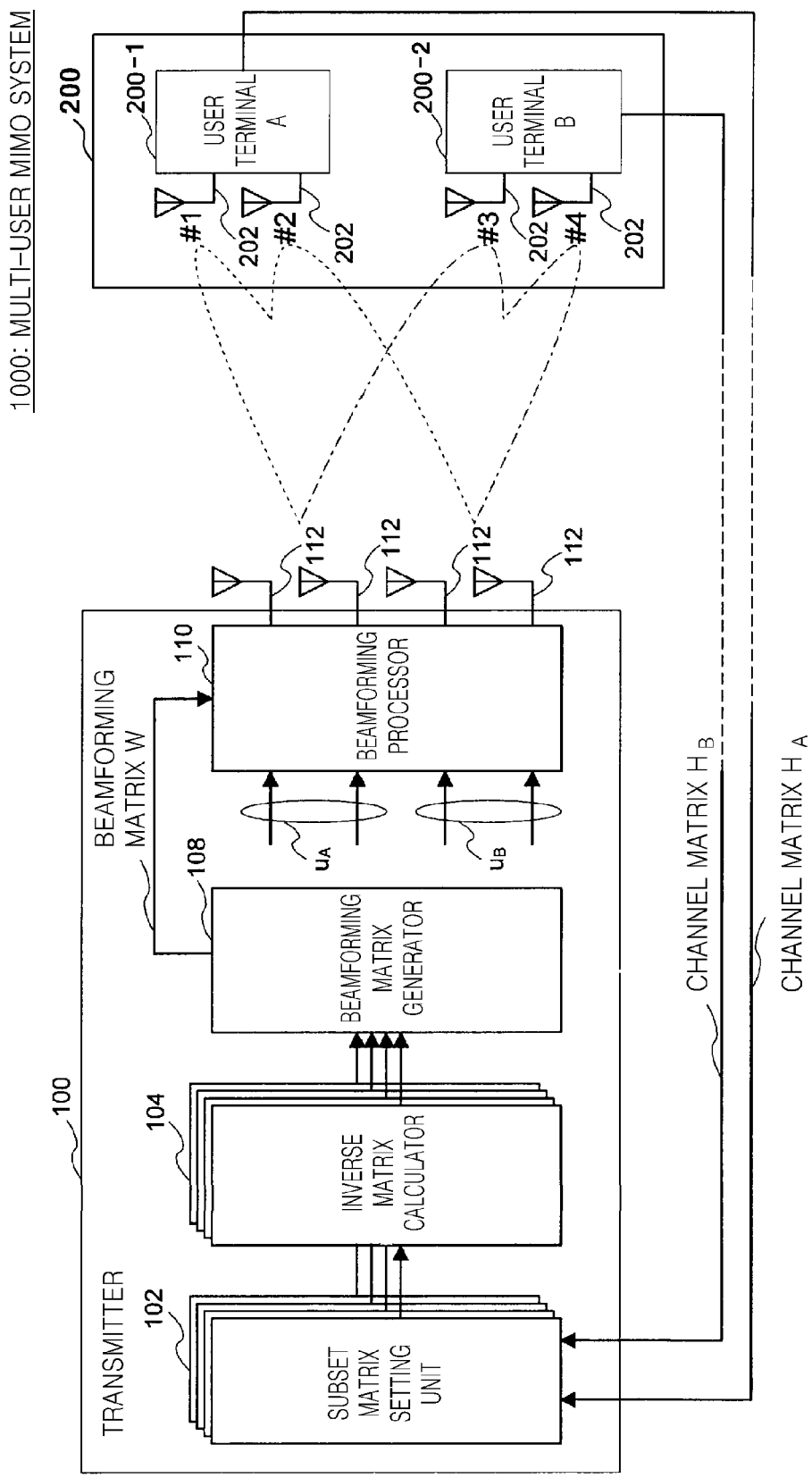
FIG. 3 is a block diagram of a multi-user MIMO system including a transmitting apparatus according to an embodiment of the present invention.
Figure 4:
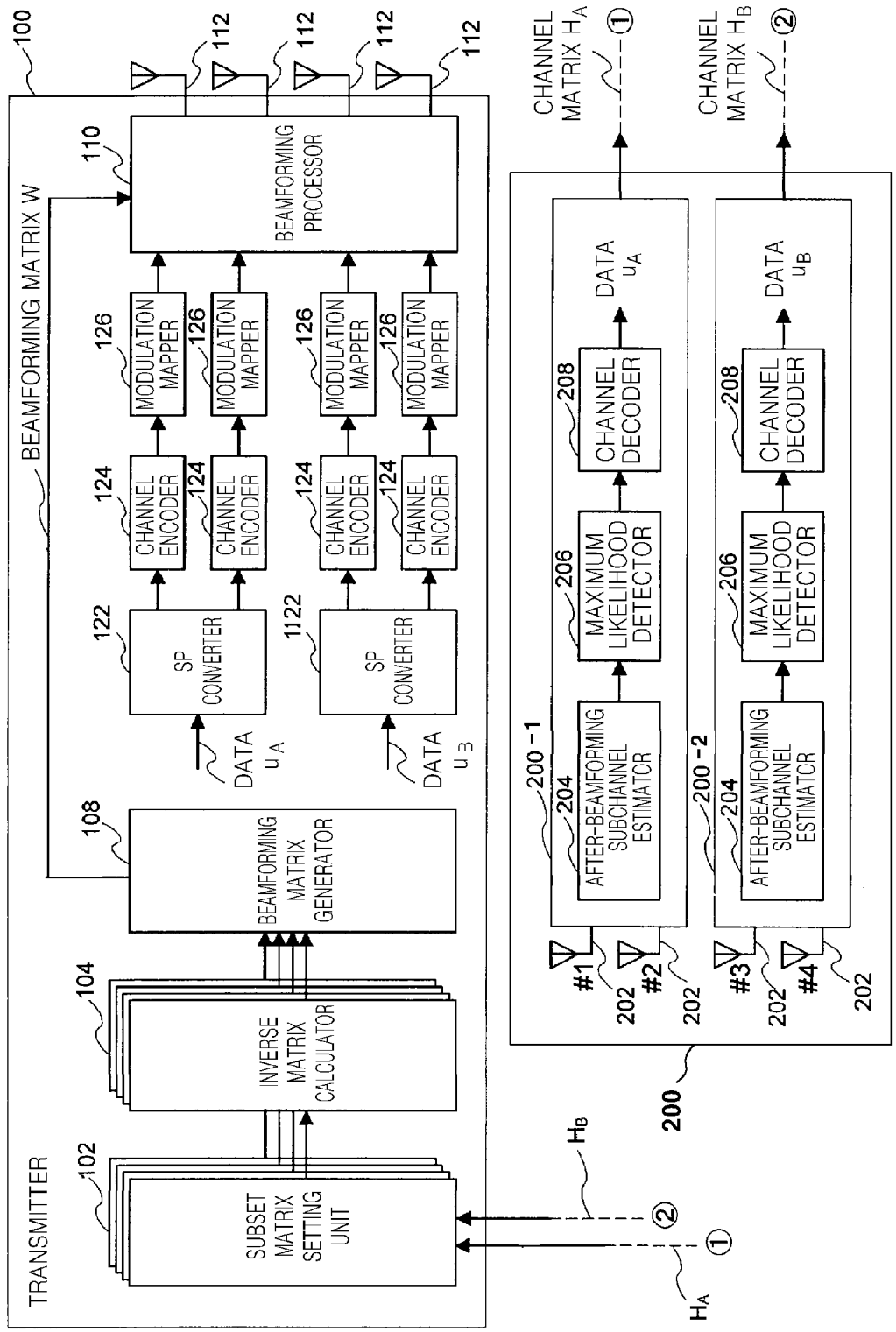
FIG. 4 illustrates the configuration of the transmitting apparatus illustrated in FIG. 3 in more detail.

FIG. 3 shows a multi-user MIMO system 1000 including a transmitter 100 according to an embodiment of the present invention. Referring to FIG. 3, the multi-user MIMO system 1000 includes the transmitter 100 and a plurality of user terminals 200-1 and 200-2. The user terminal 200-1 includes antennas 202 #1 and 202 #2 and the user terminal 200-2 includes antennas 202 #3 and 202 #4. Sub-channel matrices $H_A$ and $H_B$ respectively estimated by the user terminals 200-1 and 200-2 are fed back to the transmitter 100. According to other aspects of the present invention, the multi-user MIMO system 1000 may include additional and/or different components, such as shown in FIG. 4. Similarly, the functionality of two or more of the above units may be integrated into a single component.

The transmitter 100 includes a subset matrix setting unit 102, an inverse matrix calculator 104, a beamforming matrix generator 108, a beamforming processor 110 and a plurality of antennas 112. The inverse matrix calculator 104 or the beamforming matrix generator 108 may correspond to the beamforming matrix calculators 12 and 32 shown in FIGS. 1 and 2.

The subset matrix setting unit 102 sets a subset matrix $H_i'$ with respect to one of the antennas, 202 #i, included in one of the user terminals 200-1 and 200-2, and all the antennas 202 of the other user terminal. The subset matrix setting unit 102 sets the subset matrix $H_i'$ for each antenna of the user terminals 200-1 and 200-2 included in the multi-user MIMO system 1000. Here, #i is an index representing an ith antenna 202.

For example, the subset matrix setting unit 102 sets a subset matrix $H_1'$ with respect to the antenna 202 #1 of the user terminal 200-1 and the antennas 202 #3 and 202 #4 of the user terminal 200-2, sets a subset matrix $H_2'$ with respect to the antenna 202 #2 of the user terminal 200-1 and the antennas 202 #3 and 202 #4 of the user terminal 200-2, sets a subset matrix $H_3'$ with respect to the antenna 202 #3 of the user terminal 200-2 and the antennas 202 #1 and 202 #2 of the user terminal 200-1, and sets a subset matrix $H_4'$ with respect to the antenna 202 #4 of the user terminal 200-2 and the antennas 202 #1 and 202 #2 of the user terminal 200-1, as represented by Equation 6.

[Equation 6]

$$H_1' = \begin{bmatrix} h_{11} & h_{12} & h_{13} & h_{14} \\ h_{31} & h_{32} & h_{33} & h_{34} \\ h_{41} & h_{42} & h_{43} & h_{44} \end{bmatrix} \quad (9)$$

$$H_2' = \begin{bmatrix} h_{21} & h_{22} & h_{23} & h_{24} \\ h_{31} & h_{32} & h_{33} & h_{34} \\ h_{41} & h_{42} & h_{43} & h_{44} \end{bmatrix} \quad (10)$$

$$H_3' = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \quad (11)$$

$$H_4' = \begin{bmatrix} h_{11} & h_{12} & h_{13} & h_{14} \\ h_{21} & h_{22} & h_{23} & h_{24} \\ h_{41} & h_{42} & h_{43} & h_{44} \end{bmatrix} \quad (12)$$

The inverse matrix calculator 104 calculates an inverse matrix of the subset matrix $H_i'$ set by the subset matrix setting unit 102, as represented by Equation 7, to obtain a beamforming weight $W_i'$ for the subset matrix $H_i'$. The calculation represented by Equation 7 corresponds to the calculation represented by Equation 2 and is distinguished from the calculation represented by Equation 2 in that an interference component according to an antenna that is not included in a subset matrix is not removed. Due to this difference, a MIMO sub-channel can be formed for each user terminal in a multi-user MIMO channel after beamforming.

[Equation 7]

$$W_i' = H_i'^H (H_i' H_i'^H)^{-1} \quad (13)$$

The beamforming matrix generator 108 generates a beamforming matrix W' for block-diagonalizing a channel matrix H for each user terminal using the beamforming weight $W_i'$ calculated for the subset matrix $H_i'$. The beamforming matrix generator 108 extracts a weight vector $w_k^{(i)}$ corresponding to an antenna 202 #i of the user terminals 200-1 and 200-2 from among elements of the beamforming weight $W_i' = \{w_j^{(i)}; j=1, 2, \ldots\}$ Here, k represents an index of an element corresponding to the antenna 202 #i. The beamforming matrix generator 108 generates the beamforming matrix W' using the extracted weight vector $w_k^{(i)}$ (k=1, 2, ...).

For example, a process of selecting the weight vector $w_k^{(i)}$ corresponding to the antenna 202 #1 of the user terminal 200-1 according to an embodiment of the present invention is explained. It can be known from Equation 6 that the first row of the sub-set matrix $H_1'$ with respect to the antenna 202 #1 of the user terminal 200-1 includes a matrix element corresponding to the antenna 202 #1 of the user terminal 200-1. When the inverse matrix of the subset matrix $H_1'$ is calculated according to Equation 7, Equation 8 is obtained. Here, the elements of the first row of the sub-set matrix $H_1'$ correspond to the elements of the first column of the beamforming weight $W_1'$. Accordingly, the beamforming matrix generator 108 extracts a vector $w_1^{(1)}$ located in the first column of the beamforming weight subset matrix $W_1'$ as the weight vector. Furthermore, the beamforming matrix generator 108 extracts weight vectors $w_1^{(2)}$, $w_3^{(3)}$ and $w_3^{(4)}$ for the antenna 202 #2 of the user terminal 200-1 and the antennas 202 #3 and 202 #4 of the user terminal 200-2. The beamforming matrix generator 108 generates the beamforming matrix W' using the extracted weight vectors $w_1^{(1)}$, $w_1^{(2)}$, $w_3^{(3)}$ and $w_3^{(4)}$, as represented by Equation 8.

[Equation 8]

$$W_1' = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \quad (14)$$

$$= [\, w_1^{(1)} \quad w_2^{(1)} \quad w_3^{(1)} \,]$$

$$W' = [\, w_1^{(1)} \quad w_1^{(2)} \quad w_3^{(3)} \quad w_3^{(4)} \,] \quad (15)$$

The beamforming processor 110 performs beamforming on a transmission symbol vector s using the beamforming matrix W' generated by the beamforming matrix generator 108, and then transmits the transmission symbol vector s after beamforming to the user terminals 200-1 and 200-2. Consequently, a receiving symbol vector r is represented by Equation 9. It can be known from Equation 9 that a practical channel matrix HW' after beamforming is block-diagonalized for each user terminal and an interference component between the user terminals 200-1 and 200-2 is removed. The practical channel matrix HW' includes an interference component between antennas of the user terminals 200-1 and 200-2. For example, an element $\rho_{21}$ of the practical channel matrix HW' is a correlation component according to a weight vector for the antenna 202 #1 and a channel vector of the antenna 202 #2 and corresponds to a component received by the antenna 202 #2.

[Equation 9]

$$r = HW's = \begin{bmatrix} 1 & \rho_{12} & 0 & 0 \\ \rho_{21} & 1 & 0 & 0 \\ 0 & 0 & 1 & \rho_{34} \\ 0 & 0 & \rho_{43} & 1 \end{bmatrix} \begin{bmatrix} s_1 \\ s_2 \\ s_3 \\ s_4 \end{bmatrix} \quad (16)$$

The aforementioned effect is obtained because the subset matrix setting unit 102 selects a subset matrix such that an MIMO sub-channel is left. According to this process, a beam going toward one of the antennas of a user terminal does not form a null for the other antenna of the user terminal, and a beam going toward the other antenna does not form a null for the antenna. Consequently, an MIMO channel is formed for the multiple antennas of the user terminals 200-1 and 200-2 and the channel matrix of the multi-user MIMO channel can be block-diagonalized such that interference between the user terminals 200-1 and 200-2 is removed.

FIG. 4 shows the multi-user MIMO system 1000 in more detail. Referring to FIG. 4, the transmitter 100 includes the subset matrix setting unit 102, the inverse matrix calculator 104, the beamforming matrix generator 108, the beamforming processor 110, serial/parallel (S/P) converters 122, channel encoders 124, and modulation mappers 126. The inverse matrix calculator 104 and the beamforming matrix generator 108 may be combined (as shown in FIG. 4) and referred to as a beamforming matrix calculator.

The subset matrix setting unit 102 sets the sub-channel matrix $H_i'$ based on the sub-channel matrices $H_A$ and $H_B$ fed back from the user terminals 200-1 and 200-2. Then, the inverse matrix calculator 104 calculates an inverse matrix of the sub-channel matrix $H_i'$ to obtain the beamforming weight $W_i'$ corresponding to each antenna. The beamforming matrix generator 108 generates the beamforming matrix W' based on the beamforming weight $W_i'$ and transmits the beamforming matrix W' to the beamforming processor 110.

Data $u_A$ and $u_B$ transmitted to the user terminals 200-1 and 200-2 is distributed to a plurality of sub-streams according to SP converters 122. The sub-streams are channel-encoded by the channel encoders 124, and then modulation-mapped through a predetermined modulation method according to the modulation mappers 126, respectively.

The beamforming processor 110 applies the beamforming matrix W' generated by the beamforming matrix generator 108 to the transmission symbol vector s including transmission symbols input from the modulation mappers 126. The beamforming processor 110 transmits the transmission symbol vector s after beamforming to the user terminals 200-1 and 200-2 through the antennas 112.

As shown in FIG. 4, the user terminals 200-1 and 200-2 include an after-beam-forming sub-channel estimator 204, a maximum likelihood detector 206, and a channel decoder 208. The after-beam-forming sub-channel estimator 204 estimates a sub-channel matrix after beamforming. The maximum likelihood detector 206 detects signals using an MLD method for a received receiving symbol vector after beamforming based on the estimated sub-channel matrix after beamforming. The channel decoder 208 channel-decodes the signals detected by the maximum likelihood detector 206 to reproduce data.

According to aspects of the present invention, in a multi-user MIMO system using a zero-forcing beamforming technique, a beamforming matrix for transmitting multiple streams to a user terminal can be easily calculated. Accordingly, throughput with respect to the user terminal can be improved. This technique is effective when the user terminal includes a plurality of antennas and has an MIMO signal detection algorithm.

Aspects of the present invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs, DVDs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodi-

What is claimed is:

1. A transmitting apparatus comprising:
   a subset matrix setting unit to set a subset matrix corresponding to a channel matrix with respect to each of a plurality of antennas of at least one of a plurality of user terminals, using channel matrices fed back from the plurality of user terminals;
   a beamforming matrix calculator to perform a predetermined operation using the set subset matrix so as to calculate a beamforming matrix composed of weight vectors respectively corresponding to the plurality of antennas of each of the plurality of user terminals;
   a beamforming processor to perform a beamforming process on data to be transmitted according to the calculated beamforming matrix so as to generate a transmission signal; and
   antennas to transmit the transmission signal to the plurality of user terminals.

2. The transmitting apparatus of claim 1, wherein the subset matrix setting unit sets a subset matrix with respect to one of the antennas of one of the plurality of user terminals and antennas of another of the user terminals.

3. The transmitting apparatus of claim 1, wherein the beamforming calculator comprises:
   an inverse matrix calculator to calculate an inverse matrix of the subset matrix to obtain beamforming weights respectively corresponding to the antennas; and
   a beamforming matrix generator to generate a beamforming matrix that block-diagonalizes the channel matrices for the plurality of user terminals.

4. The transmitting apparatus of claim 3, wherein the beamforming matrix generator extracts a vector component corresponding to a predetermined antenna from a beamforming weight corresponding to the predetermined antenna and uses the extracted vector component as a beamforming weight component with respect to the predetermined antenna.

5. A transmitting method comprising:
   setting a subset matrix corresponding to a channel matrix with respect to each of a plurality of antennas of at least one of a plurality of user terminals, using channel matrices fed back from the plurality of user terminals;
   performing a predetermined operation using the set subset matrix so as to calculate a beamforming matrix composed of weight vectors respectively corresponding to the plurality of antennas of each of the plurality of user terminals;
   performing a beamforming process on data to be transmitted according to the calculated beamforming matrix so as to generate a transmission signal; and
   transmitting the transmission signal to the plurality of user terminals.

6. The transmitting method of claim 5, wherein the setting of the subset matrix comprises setting a subset matrix with respect to one of the antennas of one of the plurality of user terminals and antennas of another of the user terminals.

7. The transmitting method of claim 5, wherein the calculating of the beamforming matrix comprises:
   calculating an inverse matrix of the subset matrix to obtain beamforming weights respectively corresponding to the antennas; and
   generating a beamforming matrix that block-diagonalizes the channel matrices for the plurality of user terminals.

8. The transmitting method of claim 7, wherein the generating of the beamforming matrix comprises extracting a vector component corresponding to a predetermined antenna from a beamforming weight corresponding to the predetermined antenna and using the extracted vector component as a beamforming weight component with respect to the predetermined antenna.

9. A computer readable recording medium storing a program to execute the transmitting method of claim 5.

* * * * *